Patented Feb. 23, 1926.

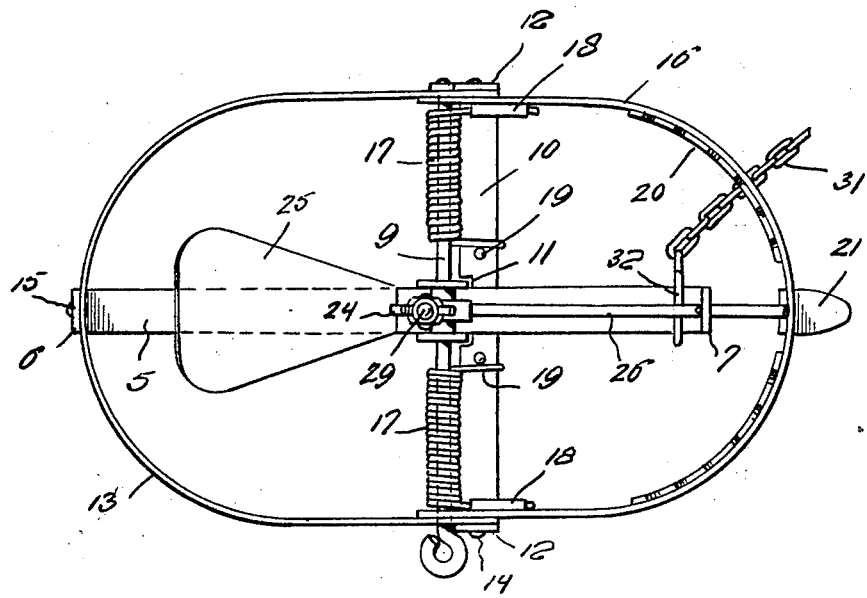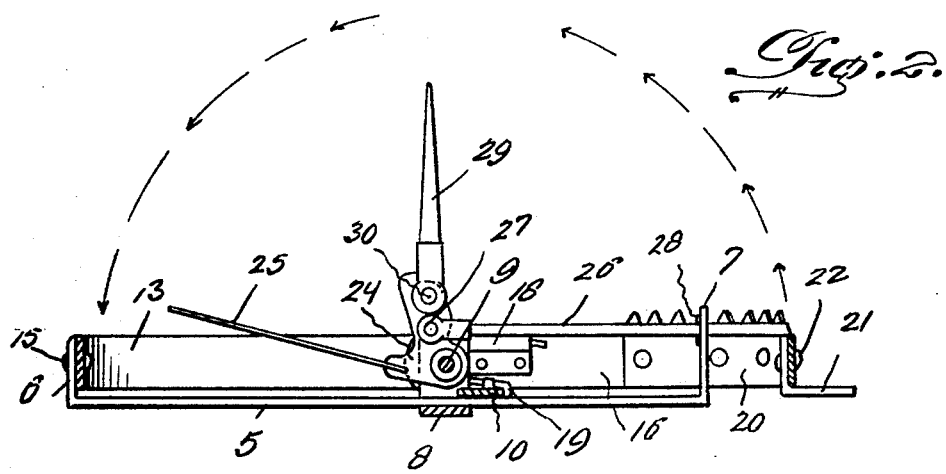

1,573,892

UNITED STATES PATENT OFFICE.

PETER G. YELM, OF GENOA, NEBRASKA.

ANIMAL TRAP.

Application filed September 16, 1925. Serial No. 56,692.

*To all whom it may concern:*

Be it known that I, PETER G. YELM, a citizen of the United States, residing at Genoa, in the county of Nance and State of Nebraska, have invented certain new and useful Improvements in an Animal Trap, of which the following is a specification.

The present invention relates to an animal trap for catching mink, and the like, and has for its prime object to provide an exceedingly simple construction which is durable and sturdy, inexpensive to manufacture, efficient and reliable in use, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of the trap,

Figure 2 is a longitudinal section therethrough.

Referring to the drawing in detail it will be seen that 5 designates a base bar having its ends bent upwardly as at 6 and 7. A U-shaped member 8 has its intermediate portion fixed to the under surface of the intermediate portion of the bar 5, and its sides rising upwardly and provided with apertures for receiving a bolt 9 which extends transversely across the top of the bar 5. A bar 10 extends transversely across the top of the bar 5 to one side of the member 8 and is provided in its edges with notches 11 which receive the adjacent edge portions of the upright sides of the member 8. The ends of the bar 10 terminate in upright ears 12 to which are fixed the extremities of the fixed U-shaped jaw 13 by means of rivets 14 or the like. The center of the jaw 13 is fixed to the upright ears 6 of the base bar 5 by rivet 15 or in any other suitable manner. The bolt 9 extends through the terminal portions of the jaw 13. A U-shaped movable jaw 16 has its extremities pivotally mounted on the bolt 9 within the extremities of the jaw 13. Springs 17 are coiled about the bolt 9, and the outer ends thereof are attached to the side portions of the jaw 16 by means of brackets 18 while the inner ends thereof are engaged with the bar 10 as at 19. These springs 17 are tensioned to normally hold the movable jaw 16 in a closed position, that is swung over within the jaw 13. A pair of curved toothed bars 20 may be riveted to the curved portion of the jaw 16. A stop bracket 21 of L-shaped formation has one portion attached to the center of the jaw 16 on the inner face thereof by means of a rivet 22 or the like, while the other portion thereof extends outwardly from the bottom edge of said jaw 16 when the same is in the set position, as illustrated in the drawing. This stop bracket is adapted to engage the upper edge of the fixed jaw when the movable jaw is sprung so as to prevent it from engaging with the base bar 5.

A bell crank lever 24 is mounted on the bolt 9 and one arm thereof supports the treadle 25. A bar 26 has one end pivotally engaged with the other arm of the bell crank lever 24 as at 27, the upright ear 7 of the base bar 5 is apertured and slidably receives the rod 26 so that the extremity thereof may be engaged over the upper edge of the jaw 16 to hold it in a set position. A stop pin 28 extends through the rod 26 for abutting the ear 7 to prevent this rod 26 from being moved too far to the right, referring to the drawing, or swinging the treadle 25 too far upwardly. It will be apparent that as soon as an animal steps on the treadle 25, the weight of the animal will swing this treadle downwardly, thereby simultaneously swinging the bell crank lever 24 to pull the rod 26 out of engagement with the movable jaw 16 so that said movable jaw will be actuated by the springs 17 to its annular engaging position. A bait stick 29 is pivotally mounted as at 30 on the same arm of the crank 24 as the rod 26. If it is not desired to use the bait stick it may be swung down to an out of the way position.

The trap may be anchored in any suitable manner, such as by means of a chain 31 engaged with the base bar 5 by a member 32 or in any other suitable manner. It will be seen that the structure is very sturdy, and there are practically no parts to get out of order, and the use of the plates 20 will insure the killing of the animal, should this be desired.

It is thought that the construction, operation, utility, and advantages of the invention will now be clearly understood without a more detailed description thereof. The present embodiment of the invention has been disclosed in detail merely by way of example since in actual practice it attains the features of advantage enumerated as desirable in the statement of the invention and the above description. Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. A trap of the class described including a longitudinally extending base bar having its ends terminating in upright ears, a transverse bar having its intermediate portion fixed to an intermediate portion of the base bar and its ends terminating in upright ears, a U-shaped member having its intermediate portion fixed to the intermediate portion of the base bar and its sides extending upwardly, a bolt extending through the sides of the member, and disposed in spaced parallelism to the transverse bar, a fixed U-shaped jaw having its extremities fixed to the upright ears of the transverse bar and its intermediate portion fixed to one upright ear of the base bar, said bolts extending through the ends of said fixed jaw, a movable U-shaped jaw having its ends pivotally receiving the bolt, coil springs about the bolt, one extremity of each coil spring attached to the movable jaw and the other extremity to the transverse bar for normally holding the movable jaw closed in the fixed jaw, and trip means for holding the movable jaw in a set position.

2. A trap of the class described including a longitudinally extending base bar having its ends terminating in upright ears, a transverse bar having its intermediate portion fixed to an intermediate portion of the base bar and its ends terminating in upright ears, a U-shaped member having its intermediate portion fixed to the intermediate portion of the base bar and its sides extending upwardly, a bolt extending through the sides of the member, and disposed in spaced parallelism to the transverse bar, a fixed U-shaped jaw having its extremities fixed to the upright ears of the transverse bar and its intermediate portion fixed to one upright ear of the base bar, said bolts extending through the ends of said fixed jaw, a movable U-shaped jaw having its ends pivotally receiving the bolt, coil springs about the bolt, one extremity of each coil spring attached to the movable jaw and the other extremity to the transverse bar for normally holding the movable jaw closed in the fixed jaw, a bell crank lever pivoted on the bolt between the upright sides of the member, a treadle on one arm of the bell crank lever, a rod pivotally engaged with the other arm of the bell crank lever, and slidably piercing the other upright ear of the base bar and having its extremity adapted to extend over the center of the movable jaw when said movable jaw is in a set position for holding the same in its set position.

3. A trap of the class described including a longitudinally extending base bar having its ends terminating in upright ears, a transverse bar having its intermediate portion fixed to an intermediate portion of the base bar and its ends terminating in upright ears, a U-shaped member having its intermediate portion fixed to the intermediate portion of the base bar and its sides extending upwardly, a bolt extending through the sides of the member, and disposed in spaced parallelism to the transverse bar, a fixed U-shaped jaw having its extremities fixed to the upright ears of the transverse bar and its intermediate portion fixed to one upright ear of the base bar, said bolts extending through the ends of said fixed jaw, a movable U-shaped jaw having its ends pivotally receiving the bolt, coil springs about the bolt, one extremity of each coil spring attached to the movable jaw and the other extremity to the transverse bar for normally holding the movable jaw closed in the fixed jaw, a bell crank lever pivoted on the bolt between the upright sides of the member, a treadle on one arm of the bell crank lever, a rod pivotally engaged with the other arm of the bell crank lever, and slidably piercing the other upright ear of the base bar and having its extremity adapted to extend over the center of the movable jaw when said movable jaw is in a set position for holding the same in its set position, and a bait stick pivotally engaged with the arm last mentioned of the bell crank lever.

In testimony whereof I affix my signature.

PETER G. YELM.